Figure 1:
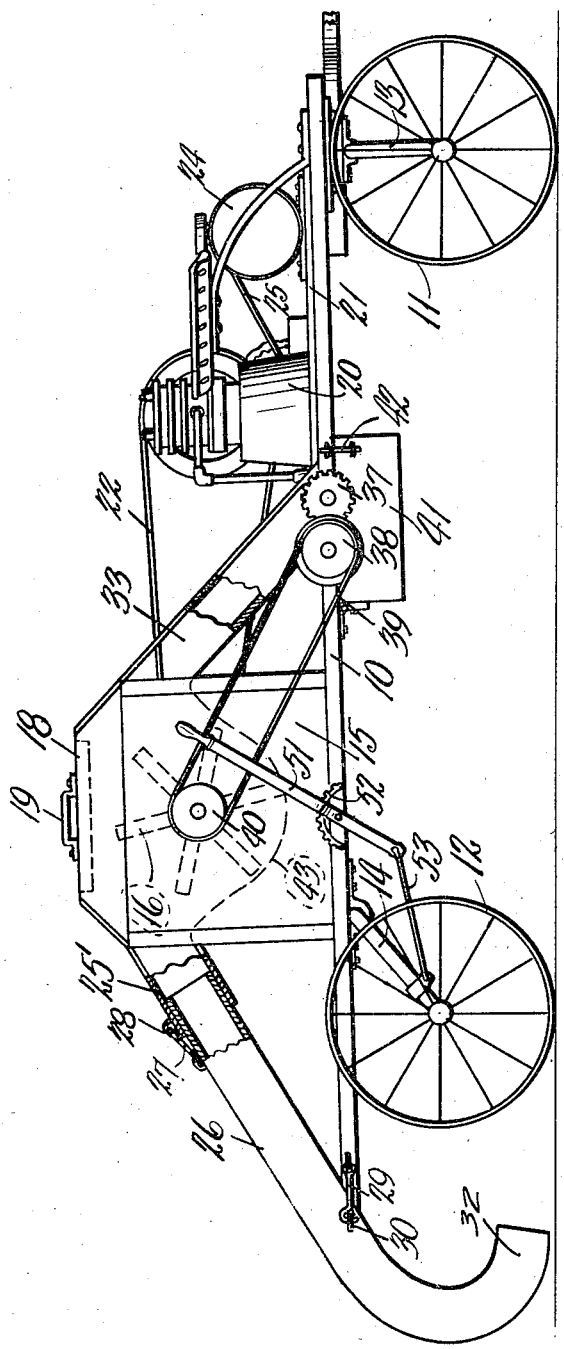

Nov. 20, 1923.

W. L. GARRETT 1,474,627

MACHINE FOR GATHERING COTTON SQUARES

Filed Oct. 28, 1922    2 Sheets-Sheet 1

Inventor
W.L.Garrett.

By Jack Ashley
Attorney

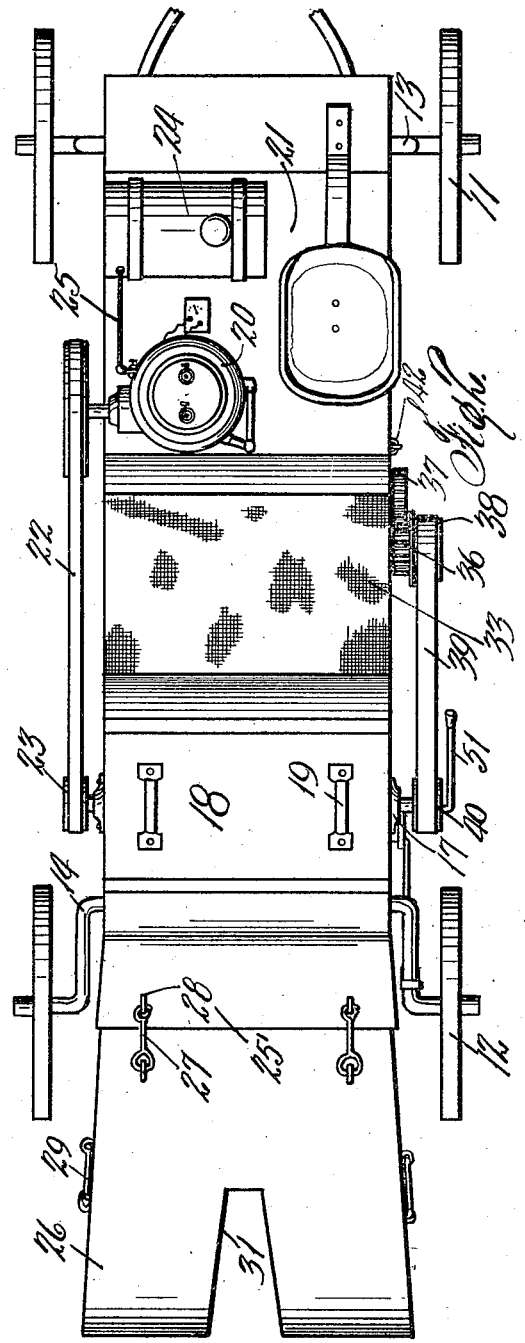
Nov. 20, 1923.
W. L. GARRETT
1,474,627
MACHINE FOR GATHERING COTTON SQUARES
Filed Oct. 28, 1922
2 Sheets-Sheet 2
Inventor
W. L. Garrett.

Patented Nov. 20, 1923.

1,474,627

UNITED STATES PATENT OFFICE.

WILLIAM L. GARRETT, OF FORNEY, TEXAS.

MACHINE FOR GATHERING COTTON SQUARES.

Application filed October 28, 1922. Serial No. 597,447.

*To all whom it may concern:*

Be it known that I, WILLIAM L. GARRETT, a citizen of the United States, residing at Forney, in the county of Kaufman and State of Texas, have invented certain new and useful Improvements in Machines for Gathering Cotton Squares, of which the following is a specification.

This invention relates to new and useful improvements in machines for gathering cotton squares and insects.

The invention contemplates a machine adapted to straddle a row of cotton and gather by means of suction the infected squares which have fallen on the ground on each side of the row. The squares are discharged between a pair of rollers which mash the same, thus destroying the eggs or larvæ of the boll weevil or other insects.

A particular object is to provide an inclined detachable flue which is bifurcated at its lower end so as to straddle the row and which communicates at its upper end with a motor driven fan; together with a discharge chute having its mouth substantially tangential to the said fan and opposite the upper end of said flue, whereby a more direct discharge of matter from the fan is effected.

An important feature resides in forwardly directed elbows on the lower bifurcated end of the flue which constitute the mouths of the latter.

A further object is to provide an attachment to be used in place of the bifurcated flue, whereby the machine may be utilized for gathering "green bugs" and other insects which infest grain such as wheat and oats.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a side elevation of a machine constructed in accordance with the invention, Fig. 2 is a plan view of the same, Fig. 3 is a plan view of the lower end of the insect removing attachment employed when using the machine in a grain field, Fig. 4 is a side elevation of the lower end of said attachment, and Fig. 5 is an enlarged detail of the rollers.

In the drawings the numeral 10 designates a rectangular frame carried by front and rear ground wheels 11 and 12 in which arch axles 13 and 14 are mounted respectively. A rectangular fan housing 15 is mounted on the frame 10 adjacent the rear axle, and encloses a fan 16 which is journalled in suitable bearings 17 on the sides of said housing. The housing is closed by a removable top 18 having handles 19 and whereby ready access may be had to the fan.

In order to drive the fan at a high speed I mount a gas engine 20 on a platform 21 secured to the forward end of the frame 10. An endless belt 22 driven off the fly wheel of said engine drives a pulley 23 on one end of the fan shaft whereby said fan is revolved. A fuel tank 24 may be suitably mounted on said platform and be connected by a supply pipe 25 with said engine.

The upper rear side of the housing 15 has a sleeve 25 declining rearwardly therefrom, said sleeve extending transversely the entire width of said housing. The upper end of an inclined flue 26 is adapted to telescope into the outer end of the sleeve, as is shown in Fig. 1. The flue may be secured in the sleeve by means of snap hooks 27 engaging in eyes 28 on the sleeve, as well as by similar hooks 29 connected to the sides of the frame 10 and engaging in eyes 30 on the sides of said flue. The sides of the flue diverge downwardly and a relatively wide slot 31 is provided centrally in the lower portion so that a row of plants can pass therethru. An important feature of the invention is the elbows 32 which are integral with the bifurcations of the flue and directed forwardly. The ends of the elbows constitute mouths which are disposed on each side of the row and approach the fallen squares in the furrows as the machine is drawn. A particular advantage is had by this arrangement as a vacuum is created some distance in front of the mouths which acts on the fallen squares and tends to draw them toward the mouths before the latter are brought into proximity with them. It will be seen that the entire action of the suction is utilized in this manner, which would not be true if the ends of the flue terminated directly over the furrows.

Opposite the sleeve 25' and communicating with the front side of the housing 15 is the upper end of a discharge chute 33, the top side of which is preferably made of wire screen or the like. This chute also extends transversely the width of the housing and a pair of rollers 34 and 35 are located at the lower end of said chute. The said rollers are parallel and are suitably journalled in the longitudinal members of the frame 10. Gears 36 and 37 are mounted on corresponding ends of the roller shafts and are constantly in mesh. Mounted outwardly of the gear 36 on the roller shaft is a flanged pulley 38 which is driven by means of an endless belt 39 which in turn is driven by a pulley 40 on the corresponding end of the fan shaft. It will be seen that when the fan revolves motion is imparted to the roller 34 which transmits motion to the other roller thru the gears 36 and 37.

It will be seen that as the punctured squares are drawn thru the flue 26 and into the housing 15, they are thrown by the fan 16 into the mouth of the chute 33. As said squares reach the bottom of the chute they are crushed between the rollers 34 and 35 and discharged into a receptacle 41 extending transversely of the machine and hinged to the underside of the frame 10. One side of the receptacle is held in place by means of hooks 42 or the like, and when it is desired to empty the pan it is only necessary to disengage the hooks and let the pan swing down, whereby the crushed matter will fall upon the ground.

The breast 43 of the fan housing as shown in dotted lines in Fig. 1, is curved from the opening of the sleeve 25 to the mouth of the discharge chute 33, conforming to the contour of the fan and being in close proximity to the outer edges of the blades as the fan revolves. A particular advantage is had in the location of the mouth of the said chute, as it will be seen that said mouth is substantially tangential to the path of the fan and as the fan receives the squares from the flue they are readily thrown into said mouth by centrifugal force. By this arrangement the squares are conveyed thru the machine in a more positive manner and are prevented from lodging in the fan housing.

In Figs. 3 and 4 I have shown a modification in the form of an attachment which may be used for removing insects such as "green bugs" from growing wheat, oats or the like. The attachment comprises a flue 50 which may be connected in the sleeve 25 in place of the bifurcated flue 26. No slot is provided in the attachment and instead of having an elbow, the lower end is directed downwardly and terminates considerably short of the ground so that the mouth will be over the top of the grain. "Green bugs" and other insects are then readily removed from the grain by the vacuum and sucked thru the machine in the same manner as the squares.

On one side of the frame 10 I mount a lever 51 and a locking segment 52, said lever being connected with the rear axle by means of a link 53. It will be seen that said axle may be shifted by said lever and a vertical adjustment thereby had. By such adjustment the mouth of the attachment 50 may be brought into proximity to the top of the grain at different stages of its growth. It is obvious that the bifurcated flue 26 may be adjusted likewise by said lever.

Various changes and modifications may be made within the scope of the appended claim.

What I claim, is:

In a machine of the class described, the combination of a rectangular wheeled frame adapted to straddle a row of plants, a rectangular fan housing mounted on the central portion of said frame, a fan mounted to revolve in said housing, a flue communicating with the housing and declining from the upper rear side of the same and being bifurcated at its lower end, the said bifurcations terminating in forwardly directed elbows constituting the mouths of said flue and being adapted to travel in the furrows on each side of the row and approach the fallen squares therein as the machine is drawn, a discharge chute declining from the upper front side of said housing and having its mouth substantially tangential to the path of the fan, a pair of rollers extending transversely of the machine at the bottom of said chute between which the discharged matter is crushed, and means for driving the fan and said rollers.

In testimony whereof I affix my signature.

WILLIAM L. GARRETT.